(12) United States Patent
Kury (10) Patent No.: US 9,638,363 B2
(45) Date of Patent: May 2, 2017

(54) HOSE NIPPLE AND CORRESPONDING HOSE ARRANGEMENT

(75) Inventor: Werner Kury, Mullheim (DE)

(73) Assignee: Neoperl GmbH, Müllheim (DE)

( * ) Notice: Subject to any disclaimer, the term of this patent is extended or adjusted under 35 U.S.C. 154(b) by 501 days.

(21) Appl. No.: 14/127,302

(22) PCT Filed: Apr. 26, 2012

(86) PCT No.: PCT/EP2012/001788
§ 371 (c)(1),
(2), (4) Date: Dec. 18, 2013

(87) PCT Pub. No.: WO2012/175154
PCT Pub. Date: Dec. 27, 2012

(65) Prior Publication Data
US 2014/0116552 A1    May 1, 2014

(30) Foreign Application Priority Data
Jun. 24, 2011 (DE) .................... 20 2011 104 370 U (51) Int. Cl.
*F16L 19/02* (2006.01)
*F16L 19/025* (2006.01)

(52) U.S. Cl.
CPC ......... *F16L 19/0212* (2013.01); *F16L 19/025* (2013.01); *F16L 19/0218* (2013.01); *Y10T 137/9029* (2015.04)

(58) Field of Classification Search
CPC . F16L 19/025; F16L 19/0218; F16L 19/0212; Y10T 137/9029

USPC ......... 137/454.2; 285/18, 353, 354; 277/616
See application file for complete search history.

(56) References Cited

U.S. PATENT DOCUMENTS

| | | | |
|---|---|---|---|
| 469,830 A | 3/1892 | Cain | |
| 1,906,826 A * | 5/1933 | Smith | F16L 19/0218 277/612 |
| 2,013,293 A * | 9/1935 | Snell | F16L 23/08 285/33 |
| 3,427,053 A | 2/1969 | Dunlap et al. | |
| 4,072,328 A * | 2/1978 | Elliott | F16L 19/0218 285/148.28 |
| 4,586,735 A | 5/1986 | Innes | |
| 4,819,908 A | 4/1989 | Norkey | |
| 5,027,845 A | 7/1991 | Silagy | |
| 5,131,695 A * | 7/1992 | Wiser | F16L 19/0218 285/354 |

(Continued)

FOREIGN PATENT DOCUMENTS

| | | |
|---|---|---|
| DE | 19705857 | 8/1998 |
| GB | 2230070 | 10/1990 |
| NL | 2685271 | 3/1964 |

*Primary Examiner* — Kevin Lee
*Assistant Examiner* — P. Macade Nichols
(74) *Attorney, Agent, or Firm* — Volpe and Koenig, P.C.

(57) ABSTRACT

A hose connection piece (2), on which a sleeve-shaped insertion part (15) is arranged in the region of the outlet (14) of the passage channel (13) formed by a hose nipple (5) of the hose connection piece (2) and which is to be fastened on the nipple base body (12) of the hose nipple (5) by a snap-action or latching connection (16). The insertion part (15) can carry a sealing ring (7) for the contact flange (6) of the hose nipple (5) and/or axially secure a backflow preventer cartridge (26) which is introduced into the receiving space (25) of the hose nipple (5).

19 Claims, 5 Drawing Sheets

(56) References Cited

U.S. PATENT DOCUMENTS 5,145,219 A 9/1992 Babuder
2005/0098753 A1 5/2005 Ozaki et al.

* cited by examiner

HOSE NIPPLE AND CORRESPONDING HOSE ARRANGEMENT

BACKGROUND

The invention relates to a hose nipple having a nipple basic body, which has a flow-through channel and at which an outlet is realized for connecting to a water supply system, wherein a connection flange which extends around the outlet is integrally formed on the nipple basic body of the hose nipple, and having a sealing ring for sealing the contact flange, wherein the sealing ring is held at a collar of the hose nipple which engages behind the sealing ring.

The invention further relates to a hose arrangement for a water supply system, said hose arrangement comprising a hose connecting piece having a hose nipple and having a connection element which is held on the hose nipple for releasably connecting to the water supply system and further comprising a pressure hose which is fastened on the hose nipple in a force-fitting and/or form-fitting manner by way of a crimping sleeve.

Such types of connections are known and have proved their worth. In the case of the known connections, in this respect, the collar is turned on a lathe integrally with the hose nipple from a metal material such as brass and the like, and a resilient sealing ring is pulled over the collar and inserted into the sealing position for sealing the contact flange. In this way, the hose nipple can be supplied together with the sealing ring without there being any risk of the sealing ring being lost. Hose nipples without collars are also known where the sealing rings, which are frequently produced from a non-resilient material, for example from a composite fiber material, are supplied as separate parts.

As a result of this, the production of a hose nipple depends on whether said hose nipple is to be combined with a resilient sealing ring or a non-resilient sealing ring. In principle, a subsequent change between said two types of sealing ring is not possible.

U.S. Pat. No. 4,469,830 A has already made known a brake hose coupling, which has two coupling parts which can be placed next to each other and are couplable together so as to be releasable, and which penetrates the through channel which is arranged at right angles to the coupling longitudinal axis. To this end, each of the coupling parts has a coupling aperture, which coupling apertures abut tightly together in the coupled state of the coupling parts forming the through channel. Each coupling aperture is defined by a ring flange, on which a sealing sleeve rests which protrudes in such a manner beyond the coupling aperture that the sealing sleeves abutting tightly together in the coupled state define the through channel provided for forwarding the compressed air. The sealing sleeves have on their sleeve inside circumference in each case a ring groove into which a latching projection engages which is integrally formed on a holding sleeve which engages behind the adjacent coupling aperture by way of a cross sectional enlargement. The separating hose coupling previously known from U.S. Pat. No. 469,830 A, however, does not serve as a hose nipple, but is used as a brake hose coupling for forwarding the compressed air.

DE 197 05 857 A1 has already made known a pipeline with two drive pipes which are connected together by means of a locking sleeve. Such drive pipes are used when the excavating of a ditch and the laying of the pipeline in the ditch, for example when crossing under heavily used roads, occupied locations or buildings is not possible. In order to connect the drive pipes fixedly to each other and in order to allow the drive pipes to interlock together for this purpose, two contact recesses, which are located one behind the other, are compatible together and are realized in a substantially L-shaped manner, are arranged in a socket end and on a spigot end of said pipeline portions. At least one sliding block which extends around at least in part is arranged in the first socket contact recess proceeding from an inner wall. A sealing receiving recess is provided in the first spigot end contact recess proceeding from the outer wall and a circumferential sliding recess and in front thereof an at least partially beveled sliding face element is provided in the second spigot end contact recess. When the spigot end is inserted into the socket end, the mentioned locking sleeve is created which secures a force-locking connection between the drive pipes to each other. Compressive and tensile loads generated when laying the drive pipes are absorbed such that the drive pipes are not able to be released from one another. Over and above this, liquid tightness of the drive pipes is ensured. The afore-described pipe connection from DE 197 05 857 A1 does not provide a generic hose nipple, but serves rather for the force-locking connection between two drive pipes.

U.S. Pat. No. 5,145,219 A makes known a pipeline with two pipes connected together by means of a pipe coupling. In order to be able to connect the coupling parts, which abut against each other at the end face, of the pipe coupling together in a sealing manner, a sleeve-shaped insert part is inserted into the one coupling part, on the end face of which a sealing ring is secured by means of a ring-shaped holding cap which is held on the insert part. No generic hose nipple is previously described in U.S. Pat. No. 5,145,219 A either, rather the object of said document is a pipe coupling.

SUMMARY

The object underlying the invention is to improve the characteristics of use of a hose nipple.

To achieve said object, it is provided as claimed in the invention in the case of a hose nipple of the type described in the introduction that the collar is realized on a sleeve-shaped insert part, that the sleeve-shaped insert part penetrates the ring aperture of the sealing ring and that the insert part is connected to the nipple basic body by means of a snap-type or latching-type connection. An advantage, in this case, is that the collar is able to be attached subsequently on the hose nipple after production of the hose nipple such that even after production of the hose nipple, it is possible to change from a non-resilient sealing ring to a resilient sealing ring and vice versa. This increases the characteristics of use of the hose nipple as the hose nipple is able to be adapted to the different applications in a more flexible manner. If the snap-type or latching-type connection is released again, the sealing ring can in fact be exchanged in an effortless manner.

The development of the outlet channel defines an axis, with reference to which the terms axially and radially are used. The hose nipple is preferably realized so as to be rotationally symmetrical around the axis.

It is particularly favorable when the insert part extends the flow-through channel as the result of the insert part forming an outlet opening to the outlet of the flow-through channel of the nipple basic body. The insert part consequently surrounds the outlet opening in a ring-shaped manner. An advantage, in this case, is that the insert part does not reduce the flow characteristics of the hose nipple in the outlet region of the outlet channel or reduces them only insignificantly.

To produce the snap-type or latching-type connection, it can be provided that the insert part has at least one latching lug which engages in at least one latching receiving means on the nipple basic body in the position of use. The at least one latching lug is preferably realized on the outside of the insert part and the at least one latching receiving means is preferably realized on the inside of the nipple basic body. It is particularly favorable when a corresponding latching lug receiving means is provided for each latching lug.

Several latching lugs can be integrally formed on the insert part following one after another in the circumferential direction in the manner of segments in order to achieve a uniform hold of the insert part on the nipple basic body. However, it is particularly favorable when the latching lug is realized on the insert part so as to extend continuously around the outlet and/or the outlet opening. Consequently, a ring-shaped latching lug is produced which engages in a corresponding circumferential, groove-shaped latching lug receiving means on the nipple basic body and consequently defines and forms a snap-type or latching-type connection which is particularly difficult to release.

The insert part can have at least one longitudinal slot, preferably several longitudinal slots which can extend at least over part of the axial length of the insert part. It is preferably provided that the insert part is divided by longitudinal slots into axially extended fingers which are arranged at a spacing or offset from one another in the circumferential direction. A regular arrangement of the longitudinal slots and fingers is particularly favorable. The insert part can accordingly be realized slotted from one axial side. A particularly good, spring-ring-like spring action is achievable as a result of the shape of the fingers.

It can be provided that each finger bears a latching lug at its free axial end and/or that the fingers are held together and connected by means of a ring-shaped structure, for example the collar, on at least one axial end, in particular the axial end remote from the latching lugs. Consequently, the longitudinal slots divide the otherwise ring-shaped, circumferential latching lug into a sequence of segment-like individual latching lugs.

The insert part can also be realized so as to be continuous or even rotationally symmetrical in the circumferential direction.

To simplify the mounting of the insert part, it can be provided that the insert part is produced from a resilient material at least in the region of the snap-type or latching-type connection. The insert part is preferably produced on the whole from a resilient material. In this connection, it is particularly favorable when the material is resilient compared to metal materials such that the resilience of the insert part is greater than the resilience of a component with comparable dimensions which is produced from a metal material. For example, the insert part can be produced from a plastics material, for example, from a thermoplastic or from a duroplastic or from a thermoplastic elastomer. In a preferred manner, the insert part is produced using the injection molding method.

In the case of one development of the invention, it can be provided that the nipple basic body is produced from a metal material. For example, the nipple basic body can be produced from brass or copper or steel or an alloy with at least one of said materials. It is advantageous, in this case, for the nipple basic body to be producible in a simple manner as a result of lathe-turning and for the nipple basic body to be mechanically sturdy.

It can be provided that the sealing ring is produced from a non-resilient material. The advantage of such types of materials is that the sealing ring cannot be sheared off in the event of the hose connecting piece being tightened excessively. Rather, in a simple manner the sealing ring can be set at a desired contact pressure which produces a desired sealing on the contact flange. It is particularly favorable when the sealing ring is produced from a material which is less resilient than rubber. In the case of further developments, the sealing ring can also be produced from rubber.

In order to prevent the inserted sealing ring from slipping, it can be provided that the insert part has an outside contact face against which the sealing ring abuts by way of its inner surface when in the position of use. It is provided in a preferred manner that the contact face is realized in a radially oriented and/or cylindrical manner.

Simple mounting of the sealing ring on the nipple basic body can be achieved when the sealing ring can be placed onto the insert part from one side without any deformation prior to producing the snap-type or latching-type connection. In this connection, the outside diameter of the insert part at its end facing away from the collar can be defined by the outside diameter of the contact face. In this case, it is advantageous that the sealing ring is able to be placed onto the insert part, and that the insert part with the sealing ring placed thereon is then able to be latched with the nipple basic body. As an alternative to this, the sealing ring can be placed onto the contact flange for mounting, and the insert part is able to be pushed through the positioned sealing ring and latched with the nipple basic body.

One solution of the stated object of independent significance can provide that in the case of a hose nipple with a nipple basic body which has a flow-through channel and at which an outlet for connecting to a water supply system is realized, wherein a contact flange which extends around the outlet is integrally formed on the nipple basic body of the hose nipple, it is provided that a receiving space is realized in the flow-through channel of the hose nipple on the nipple basic body, in which receiving space a backflow preventer cartridge which is traversed in use is removably inserted, and that at the outlet a sleeve-shaped insert part is connected to the nipple basic body by means of a snap-type or latching-type connection which holds the inserted backflow preventer cartridge in the receiving space, wherein the backflow preventer cartridge locks the snap-type or latching-type connection in the blocking direction. It is advantageous, in this connection, for a self-locking fastening of the backflow preventer cartridge which is simply mountable on a hose nipple to be created.

For mounting, the backflow preventer cartridge is initially inserted into the receiving space, and the insert part is then placed onto the hose nipple and latched, as a result of which the backflow preventer cartridge is held in the receiving space which prevents the backflow preventer cartridge from falling out of the receiving space.

It is particularly favorable when the hose nipple, in this connection, is of the type described in the introduction, the mentioned collar being realized on the sleeve-shaped insert part. The insert part as claimed in the invention can consequently secure the backflow preventer cartridge axially in the receiving space on the one hand and bear the sealing ring for the contact flange on the other hand.

In the case of one development of the invention, it can be provided that, at its end which is remote from the outlet, the receiving space merges into the remaining flow-through channel by means of a diameter narrowing. In this case, it is advantageous for the diameter narrowing to provide an axial stop for the backflow preventer cartridge such that during operation in the direction of flow the backflow preventer cartridge is able to be held axially by the diameter narrowing.

To set up the self-locking locking means of the snap-type or latching-type connection, it can be provided that at least one latching lug, which, in the position of use, engages into a latching lug receiving means which is realized on the nipple basic body, is realized on the outside of the sleeve-shaped insert part, and that a preferably conical inclined face which, when viewed from the receiving space, forms a diameter narrowing from a first diameter to a second diameter, is realized on the inside of the sleeve-shaped insert part in the region of the at least one latching lug, wherein the first diameter is greater than an outside diameter of the backflow preventer cartridge and the second diameter is smaller than the outside diameter of the backflow preventer cartridge. In a preferred manner, the inclined face is conical and realized so as to extend around the outlet.

In this case, it is advantageous for a means, by way of which an axially aligned force is able to be deflected into a radially aligned force, to be provided by the inclined face such that an axial application of the backflow preventer cartridge can be converted into a radial application of the at least one latching lug which is realized on the outside of the insert part opposite the inclined face. As a result of said radially outwardly directed force, the latching lug is pressed into the latching lug receiving means and is radially fixed such that the snap-type or latching-type connection is locked.

In particular, it can be provided that the backflow preventer cartridge acts upon the or an inside inclined face of the sleeve-shaped insert part in the blocking direction in such a manner that the at least one latching lug is fixed radially in the latching lug receiving means. Consequently, the backflow preventer cartridge which is operated in the blocking direction can be prevented from knocking the insert part out of the snap-type or latching-type connection and in this way from itself being able to be pushed out of the receiving space.

It can be provided that realized radially on the outside of the backflow preventer cartridge, is a preferably conical counter inclined face which interacts with the or an inside inclined face of the insert part in such a manner that an axial application of the backflow preventer cartridge is converted into a radially outwardly directed application of the backflow preventer cartridge on a latching lug which is realized on the outside of the insert part. In this case, it is advantageous for the design of two inclined faces which correspond to one another, contact one another and slide toward one another to be a simple means for deflecting the forces.

In the case of one development of the invention, it can be provided that the insert part has an outside contact face against which a sealing ring abuts by way of its inner surface in the position of use. It is particularly favorable, in this case, when the contact face of the insert part is defined on both sides in the axial direction by collars or shoulders. It is advantageous, in this case, for the sealing ring to be fixable on the insert part in the axial direction, which simplifies and facilitates the mounting of the insert part on the nipple basic body once the backflow preventer cartridge has been inserted into the receiving space.

It can be provided that the receiving space has an axial length which is greater than an axial length of the backflow preventer cartridge. In this case, it is advantageous that consequently an axial clearance is formed for the backflow preventer cartridge which allows for axial displacement of the backflow preventer cartridge when changing between an operation in the outlet opening and an operation in the blocking direction. Consequently, when operating in the outlet direction, the backflow preventer cartridge can be in a position which allows the snap-type or latching-type connection to be released, whilst when operating in the blocking direction, the backflow preventer cartridge is displaced axially into a position in which the snap-type or latching-type connection is locked. In said position, the insert part cannot be released or at least cannot be released unintentionally from the nipple basic body.

A backflow preventer cartridge is generally understood to be a compact backflow preventer (RV) which allows the flow of a liquid only in one direction. A backflow preventer consequently automatically closes when the flow direction is reversed from one flow direction into a blocking direction and also automatically opens when the flow direction is reversed from a blocking direction into a flow direction.

As claimed in the invention, it is preferably provided that the backflow preventer cartridge is inserted into the receiving space in an orientation in which a blocking direction, which is defined by the backflow preventer cartridge, points from the backflow preventer cartridge to the outlet. In this case, it is advantageous for the backflow preventer cartridge to be pressed automatically against the insert part in the case of inflow in the blocking direction and for the snap-type or latching-type connection to be locked and secured in this way.

The invention can be used advantageously in the case of a hose arrangement of the type mentioned in the introduction where the hose nipple is realized as claimed in the invention as described. The hose arrangement as claimed in the invention consequently enables the hose nipple to be provided in a flexible manner depending on the desired requirements and functionalities without having to modify the basic shape of the nipple basic body of the hose nipple. The latter can be produced in a standardized manufacturing method for all applications provided.

BRIEF DESCRIPTION OF THE INVENTION

The invention is now described in more detail by way of exemplary embodiments, however it is not restricted to said exemplary embodiments. Further exemplary embodiments are produced as a result of combining individual or several features of the protected claims together and/or with individual or several features of the exemplary embodiments, in which:

DETAILED DESCRIPTION OF THE PREFERRED EMBODIMENTS

Figure 1:
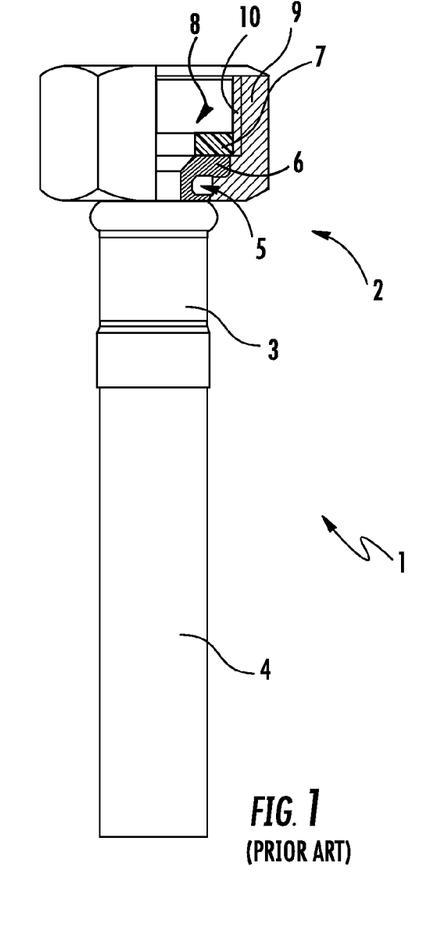
FIG. 1 shows a hose arrangement as claimed in the prior art with a resilient sealing ring.

A known hose arrangement which is identified as a whole in FIG. 1 by the reference 1 has a hose connecting piece 2 which is fastened to a pressure hose 4 by way of a crimping sleeve 3.

The hose connecting piece 2 has a hose nipple 5, on the contact flange 6 of which a sealing ring 7 is placed. The integral hose nipple 5 penetrates the sealing ring 7 and a collar 8, which extends around in the circumferential direction, engages behind the sealing ring 7 and holds it axially, is realized on the end on the side of the outlet.

The sealing ring 7 is formed of resilient material and for mounting is pulled over the collar 8 by the inside diameter of the sealing ring 7 being temporarily enlarged in a resilient manner.

The hose connecting piece 2 has a connection element 9, realized as a nut, with an internal thread 10 for connection to a water supply system (not shown any further).

If the connection element 9 is tightened too strongly when connecting the hose arrangement 1, there is the risk of the resilient sealing ring 7 being sheared or sliced off.

Figure 2:
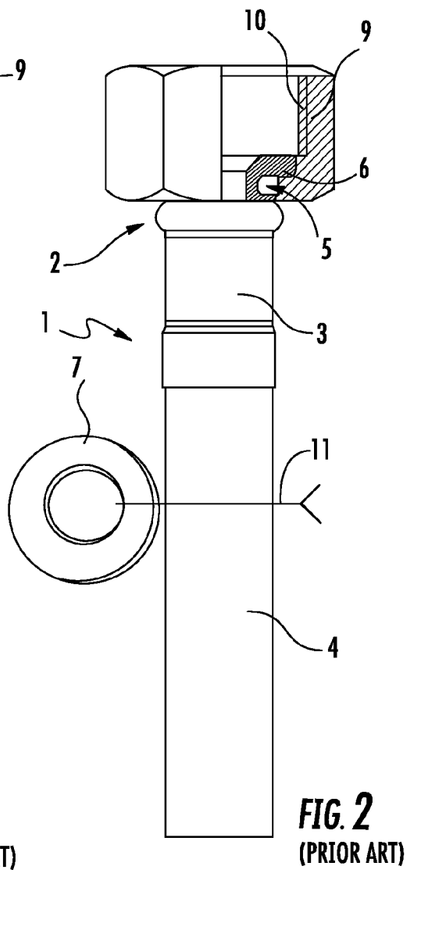
FIG. 2 shows a hose arrangement as claimed in the prior art with a non-resilient sealing ring.

In order to avoid this, in the case of other known hose arrangements 1 according to FIG. 2, the sealing rings 7 are produced from a non-resilient material. The known hose arrangements 1 are delivered with a separate sealing ring 7 which is fastened to the pressure hose 4 by way of a wire 11.

Figure 3:
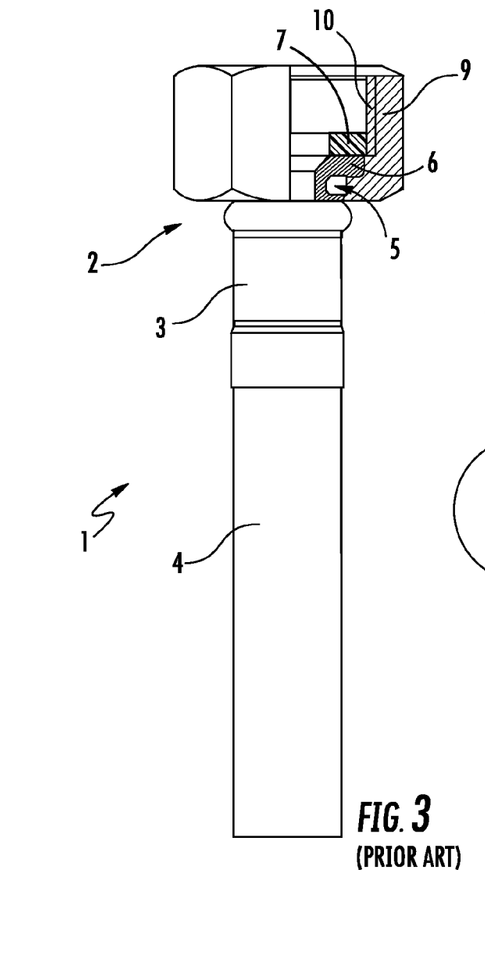
FIG. 3 shows the hose arrangement according to FIG. 2 with a mounted sealing ring.

For use, the sealing ring 7—as shown in FIG. 3—is placed onto the contact flange 6. As the sealing ring 7 is not resilient, the hose nipple 5, in this case, does not have to have a collar 8.

Figure 4:
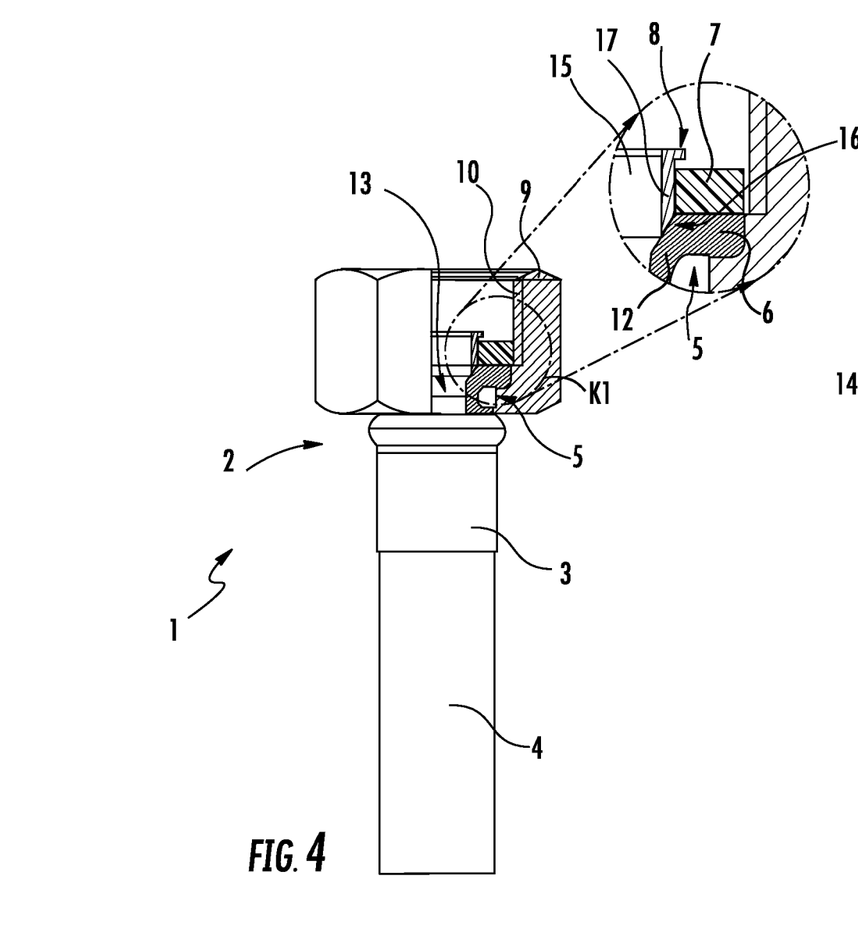
FIG. 4 shows a partially sectioned representation of a hose arrangement as claimed in the invention with a non-resilient sealing ring.
Figure 5:
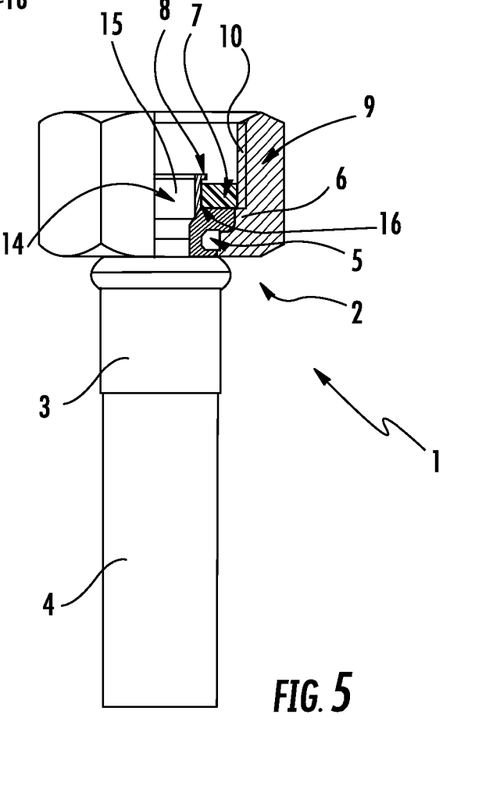
FIG. 5 shows the hose arrangement as claimed in the invention according to FIG. 4 with a resilient sealing ring.

FIG. 4 and FIG. 5 show a hose arrangement 1 as claimed in the invention which covers the represented applications of a resilient and a non-resilient sealing ring 7 by means of a standard structural design.

Figure 6:
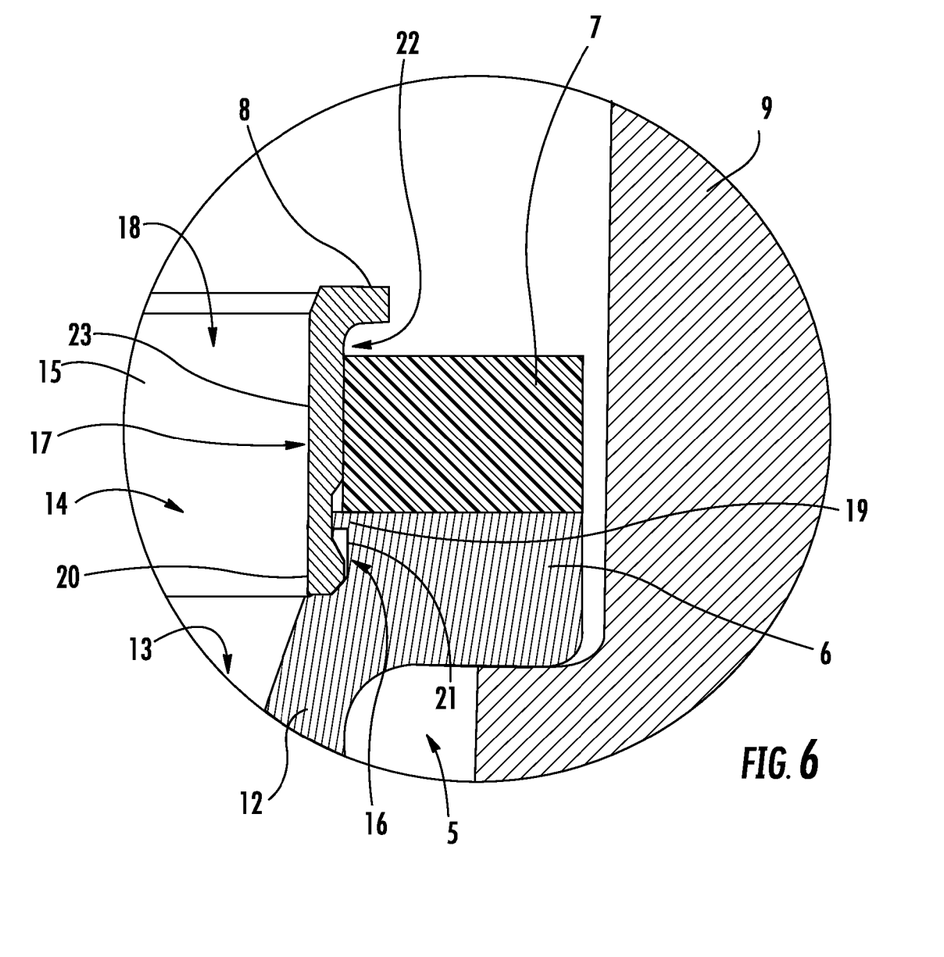
FIG. 6 shows a view of a detail from FIG. 4.

FIG. 6 shows an enlargement of the detail marked by the circle K1 in FIG. 4.

The hose arrangement 1 according to FIGS. 4 to 6 has a hose connecting piece 2 which is fastened in a force-fitting and form-fitting manner to a pressure hose 4 by way of a crimping sleeve 3. The crimping sleeve 3 is crimped for this purpose.

The hose connecting piece 2 has a hose nipple 5 which is inserted in part into the pressure hose 4.

The hose nipple 5 has a nipple basic body 12 which forms a through-flow channel 13 for conducting the liquid of the water supply system into and out of the pressure hose 4.

An outlet 14 of the flow-through channel 13, which by way of the connection element 9 realized as a nut is able to be connected to a further water supply system (not shown), is formed on the axial end of the nipple basic body 12 which is remote from the pressure hose 4.

In the exemplary embodiment, the connection element 9 is shown as a nut with an internal thread 10, however other connection elements, for example with external thread, can be arranged or fastened on the hose nipple 5 or can cooperate with the hose nipple 5.

A contact flange 6, which extends around the outlet 14 in a ring-shaped manner and is connected to a corresponding counter flange of the further water supply system, is integrally formed on the outlet-side on the nipple basic body 12.

A sealing ring 7 is placed onto the contact flange 6 for the sealed closure of the connection between the hose connecting piece 2 and the further water supply system by means of the contact flange 6.

The sealing ring 7 also extends completely circumferentially around the outlet 14.

In the exemplary embodiment shown, the sealing rings 7 have a rectangular cross section, however other cross sections, for example round cross sections, are also possible.

FIG. 4 shows a non-resilient sealing ring 7 which is produced from a composite fiber material.

In contrast, FIG. 5 shows the hose arrangement 1 with a resilient sealing ring 7 which is produced from rubber.

Both in FIG. 4 and in FIG. 5, the sealing ring 7 is held on the hose nipple 5 in the axial direction by means of a collar 8, with the collar 8 engaging behind the sealing ring 7.

The collar 8 is formed on a sleeve-shaped insert part 15 which is connected to the nipple basic body 12 of the hose nipple 5 on its hose-side axial end by means of a snap-type or latching-type connection 16.

The sleeve-shaped insert part 15 has a cylindrical inside face 17 by way of which it forms an outlet opening 18. In the case of further exemplary embodiments, the inside face 17 can also be realized in a polygonal manner in the radial cross section.

The outlet opening 18 continues into the through-flow channel 13 by means of the outlet 14.

The insert part 15 surrounds the outlet 14 of the through-flow channel 13 at least in regions and in particular completely or with at least one complete or partial interruption, which is preferably realized as a longitudinal slot.

A ring-shaped, radially inwardly protruding projection 19 in which the insert part 15 is inserted is on the inside of the outlet 14 of the nipple basic body 12.

A latching lug 20, which engages behind the projection 19 in the position of use shown in detail in FIG. 6, is realized on the insert part 15, as a result of which the snap-type or latching-type connection 16 is formed.

The latching lug 20 is realized extending completely around on the outside along the circumference of the insert part 15.

In the case of further exemplary embodiments, several latching lugs 20, which extend in the manner of segments and which are arranged at a spacing from one another in the circumferential direction, are realized along the circumference of the insert part 15.

In the case of further exemplary embodiments, the latching lugs 20 are arranged on corresponding, axially aligned fingers, radial cuts being admitted into the insert part 15 to realize said fingers.

As a result of the projection 19 extending around in a ring-shaped manner and protruding inward, a latching lug receiving means 21 in the form of a groove, which also extends around in a ring-shaped manner and in which the latching lug 20 engages and latches or snaps, is realized on the inside of the nipple basic body 12.

The nipple basic body 12 is produced from a metal material by means of lathe-turning, whilst the insert part 15 is formed from a plastics material.

On its radial outer surface, the insert part 15 has a cylindrical contact face 22, the outer diameter of which is matched to the sealing ring 7 in such a manner that its radial inner face 23, which is also cylindrical, abuts against the contact face 22. The sealing ring 7 is consequently secured on the contact flange 6 by means of the insert part 15 against displacements in the radial direction.

The outer dimension of the insert part 15 is determined or defined—apart from the collar 8 which is engaged behind—by the outside diameter of the contact face 12 in such a manner that the sealing ring 7 can be placed onto the insert part 15 without any deformation before the insert part 15 is inserted into the nipple basic body 12.

The shape and the respective diameters of the latching lug 20 and the latching lug receiving means 21 can be matched to one another such that, once the snap-type or latching-type connection 16 has been snapped-in, the insert part 15 is no longer releasable or is only releasable by way of an additional tool without destroying the insert part 15.

For example, corresponding inclinations and undercuts can be realized on the projection 19 for this purpose.

The insert part 15 is realized in a ring-shaped manner, the inside face 17 in FIGS. 4 to 6 being in the form of a cylinder. In the case of further exemplary embodiments, the ring-shaped insert part 15 can have an inner face 17 which is polygonal-shaped in radial section. The polygonal form can be produced, in this connection, from a preferably regular polygon with straight or (circular) arcuately curved edges, the convex and/or concave corners of which are realized in a rounded-off manner.

Figure 9:
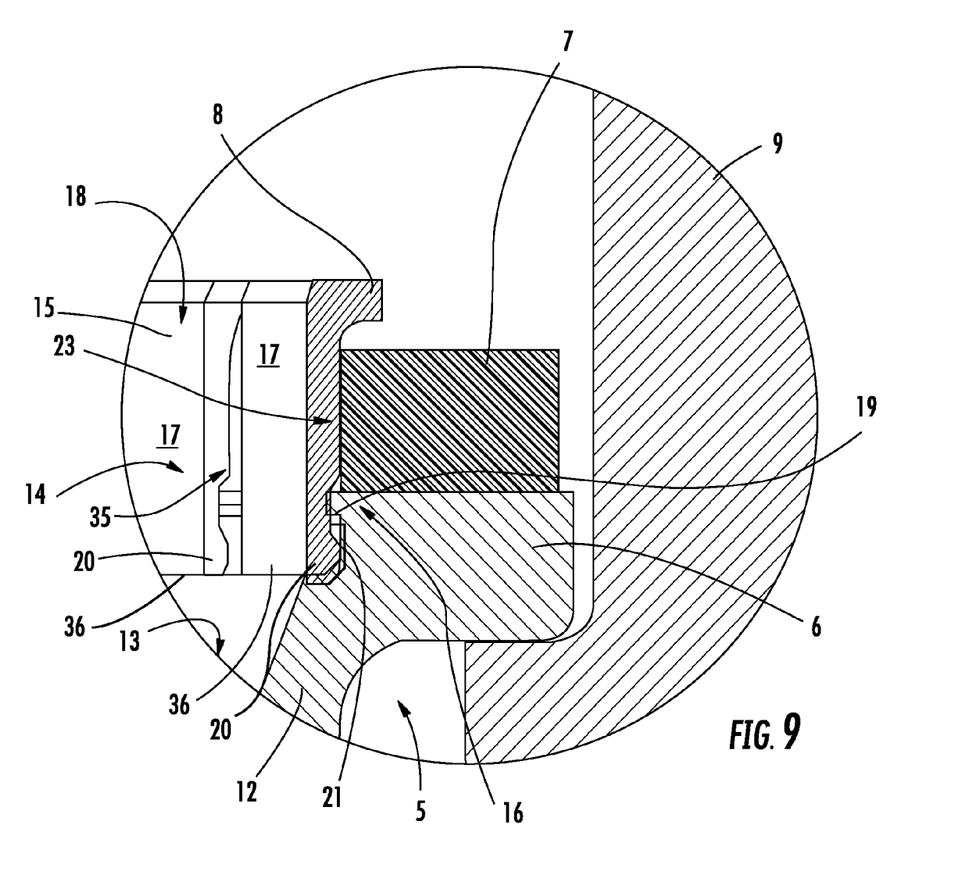
FIG. 9 shows a view of a detail of a further hose arrangement as claimed in the invention with an insert part which, compared to FIG. 6, does not extend around completely but is interrupted by longitudinal slots.

FIG. 9 shows a further exemplary embodiment as claimed in the invention which is realized analogously to the exemplary embodiment according to FIGS. 4 to 6. Components or units which are functionally or structurally identical are consequently characterized by way of the same references and are not described again.

The exemplary embodiment according to FIG. 9 differs from the exemplary embodiment according to FIGS. 4 to 6 by the form of the insert part 15. This insert part 15 has at least one longitudinal slot 35 which extends on the insert part 15 in the axial direction. The insert part 15 according to FIGS. 4 to 6, in contrast, is realized so as to extend around in a continuous manner.

Several such longitudinal slots 35, which cannot really be seen in FIG. 9, are preferably realized on the insert part 15 offset in the circumferential direction. Consequently, the shape of the insert part 15 is slotted from one axial end.

In the exemplary embodiment, the longitudinal slots 35 extend over the entire axial length of the insert part 15, in the case of further exemplary embodiments the longitudinal slots 35 extend over part of the axial length of the insert part 15.

The inside face 17 of the insert part 15 is interrupted by the longitudinal slots 35, as a result of which fingers 36 are formed. The fingers 36 bear the latching lugs 20 at their free ends.

The fingers 36 are connected together at their axial end which is remote from the latching lugs 20 by a ring-shaped structure which includes at least the ring-shaped collar 8.

The fingers 36 generate a spring-ring-like spring action.

Figure 7:
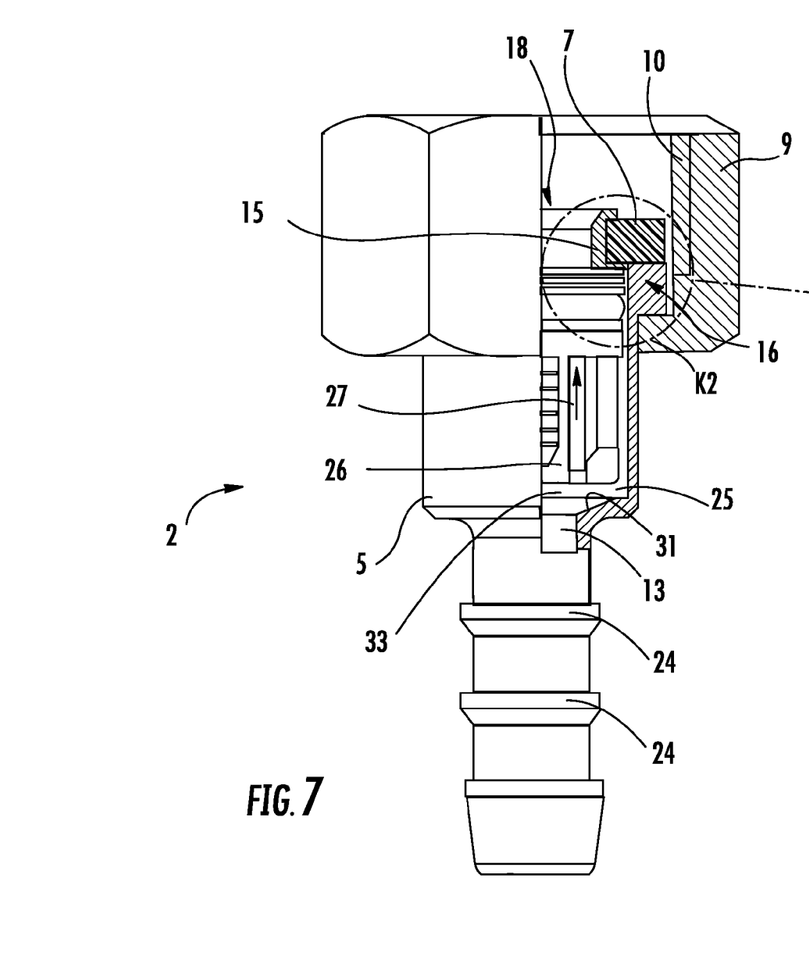
FIG. 7 shows a partially sectioned representation of a hose connecting piece of a further hose arrangement as claimed in the invention.
Figure 8:
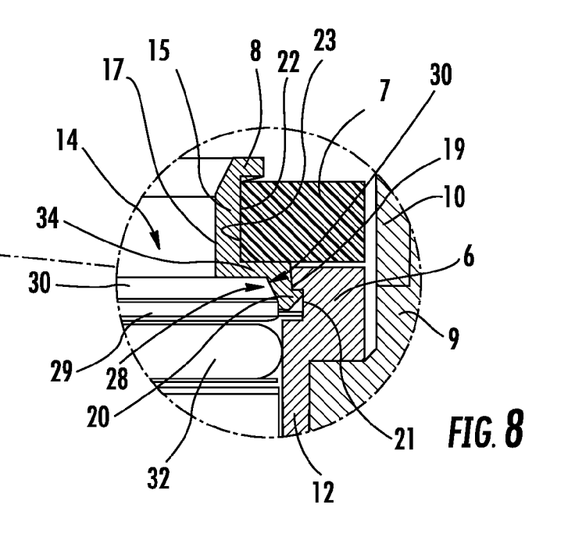
FIG. 8 shows a view of a detail from FIG. 7.

FIGS. 7 and 8 show a further exemplary embodiment of the invention.

In the case of said exemplary embodiment, components or units which are of a functionally or structurally identical type are designated with the same references as in FIGS. 4 to 6 and are not described again.

FIGS. 7 and 8, FIG. 8 showing an enlargement of the unit characterized by the circle K2 in FIG. 7, show the hose connecting piece 2 without a pressure hose 4 pushed on and without a crimping sleeve 3.

Consequently, the holding ribs 24 on the hose nipple 5, which are hidden by the pressure hose 4 in FIGS. 4 to 6 and which, together with the crimped crimping sleeve 3, bring about the force-fitting and form-fitting hold of the pressure hose 4 on the hose connecting piece 2, can clearly be seen.

A receiving space 25 is realized in the nipple basic body 12 of the hose nipple 5 at the outlet 14 of the flow channel 13.

The receiving space 25 has a cylindrical inside contour such that a backflow preventer cartridge 26 can be inserted into the receiving space 25 so as to be removable.

The backflow preventer cartridge 26 is held axially against falling out or slipping out of the receiving space 25 by the insert part 15 which is connected to the nipple basic body 12 in the manner described for FIGS. 4 to 6 by means of a snap-type or latching-type connection 16.

The backflow preventer cartridge 26 is inserted into the receiving space 25 in such a manner that the blocking direction 27 of the backflow preventer cartridge 26 points toward the outlet 14 of the through-flow channel 13 into the outlet opening 18 and to the insert part 15.

The insert part 15 is formed, in this connection, such that the backflow preventer cartridge 26 which is acted upon in the blocking direction 27 from the flow-through channel 13 locks the snap-type or latching-type connection 16.

To this end, a conical inclined face 28, which extends around the outlet 14 in the circumferential direction, is realized on the inside radially opposite the outside latching lug 20.

Realized on the contact ring 29 of the backflow preventer cartridge 26 is a counter face 30 which corresponds to the angle of inclination of the inclined face 28 in such a manner that an axially directed force, which is developed by the backflow preventer cartridge 26 in the blocking direction, is deflected into a radially outwardly directed application of the latching lug 20. As a result, the latching lug 20 is pressed into the latching lug receiving means 21 such that the snap-type or latching-type connection 16 is no longer releasable, but is locked in a self-energizing manner.

The conical inclined face 28 on the insert part 15, in this connection, is realized such that, on its end axially facing the backflow preventer cartridge 26, it has a larger (inside) diameter than the contact ring 29 of the backflow preventer cartridge, whilst the inclined face 28, on its end axially remote from the backflow preventer cartridge 26, forms a diameter which is smaller than the largest outside diameter of the backflow preventer cartridge 26 on the contact ring 29.

At the axial end of the receiving space 25 facing the pressure hose 4 and the holding ribs 24, the through-flow channel 13 forms a diameter narrowing 31 from the inside diameter of the cylindrical receiving space 25 to the smaller diameter of the equally cylindrical bore of the remaining through-flow channel 13, as a result of which the backflow preventer cartridge 26 is held axially in the flow direction, that is in the direction opposite to the blocking direction 27.

A sealing ring 32 seals off the intermediate space between the backflow preventer cartridge 26 and the inside wall of the receiving space 25 such that the liquid is directed in the flow direction through the backflow preventer cartridge 26, whilst the through-flow channel 13 is closed in the blocking direction 27.

The axial length of the backflow preventer cartridge 26 is determined in such a manner to the axial length of the receiving space 25 that when the backflow preventer cartridge 26 is inserted an axial clearance 33 remains which allows for an axial displacement of the backflow preventer cartridge 26 when changing between an operation in the flow opening and an operation in the blocking direction 27.

In this way it is achieved that the backflow preventer cartridge 26 only acts upon the insert part 15 during an operation in the blocking direction 27 such that the snap-type or latching-type connection 16 is only locked by the backflow preventer cartridge 26 during an operation in the blocking direction 27.

In the case of the examples shown in FIGS. 7 and 8, the sealing ring 7 is produced from a resilient material, for example rubber, such that the sealing ring 7 is able to be pulled over the collar 8 which protrudes radially with reference to the contact face 22.

In the mounted position which is shown in FIGS. 7 and 8, the sealing ring 7 is axially secured by means of the collar 8 and a shoulder which is realized on the opposite axial end of the contact face 22.

In the case of the hose connecting piece 2, it is proposed to arrange a sleeve-shaped insert part 15 in the region of the outlet 14 of the through-flow channel 13 which is formed by a hose nipple 5 of the hose connecting piece 2 and to fasten it on the nipple basic body 12 of the hose nipple 5 by way of a snap-type or latching-type connection 16. In this connection, the insert part 15 can bear a sealing ring 7 for the contact flange 6 of the hose nipple 5 and/or axially secure a backflow preventer cartridge 26 which is inserted into a receiving space 25 of the hose nipple 5.

The invention claimed is:

1. A hose nipple (5), comprising a nipple basic body (12), which has a flow-through channel (13) and at which a mouth (14) is realized for connecting to a water-bearing system, a contact flange (6) extends around the mouth (14) and is integrally formed on the nipple basic body (12) of the hose nipple (5), and a sealing ring (7) for sealing the contact flange (6), the sealing ring (7) is held by a collar (8) of the hose nipple (5) which engages behind the sealing ring (7), the collar (8) is formed on a sleeve-shaped insert part (15) that penetrates a ring aperture of the sealing ring (7) and the insert part (15) is connected inside of the nipple basic body (12) by a snap-type or latching-type connection (16).

2. The hose nipple (5) as claimed in claim 1, wherein the insert part (15) at least one of forms an outlet aperture (18) to the mouth (14) of the through-flow channel (13) of the nipple basic body (12) or surrounds it in a ring-shaped manner.

3. The hose nipple (5) as claimed in claim 1, wherein the insert part (15) has at least one latching lug (20) which engages in at least one latching receiving element (21) on the nipple basic body (12) in a position of use.

4. The hose nipple (5) as claimed in claim 1, wherein the insert part (15), at least in the region of the snap-type or latching-type connection (16), is produced from a resilient material.

5. The hose nipple (5) as claimed in claim 4, wherein the insert part (15), at least in the region of the snap-type or latching connection (16), is produced from a plastic material.

6. The hose nipple (5) as claimed in claim 1, wherein the nipple basic body (12) is produced from brass or copper or steel or an alloy with at least one of said materials.

7. The hose nipple (5) as claimed in claim 1, wherein the sealing ring (7) is produced from a composite fiber material.

8. The hose nipple (5) as claimed in claim 1, wherein the insert part has an outside locating face (22) against which the sealing ring (7) abuts by way of an inner face (23) thereof in the position of use.

9. The hose nipple (5), as claimed in claim 1, having the nipple basic body (12) which has the flow-through channel (13) and at which the mouth (14) for connecting to a water-bearing system is realized, the contact flange (6) extends around the mouth (14) and is integrally formed on the nipple basic body (12) of the hose nipple (5), a receiving space (25) is located in the flow-through channel (12) of the hose nipple (5) on the nipple basic body (12), in which receiving space (25) a backflow preventer cartridge (26) which is traversed in use is removably inserted, and at the mouth (14) a sleeve-shaped insert part (15) is connected to the nipple basic body (12) by the snap-type or latching-type connection (16) which holds the inserted backflow preventer cartridge (26) in the receiving space (25), and the backflow preventer cartridge (26) locks the snap-type or latching-type connection (16) in the blocking direction (27).

10. The hose nipple (5) as claimed in claim 9, wherein at an end facing away from the mouth (14), the receiving space (25) merges into the remaining flow-through channel (13) by a diameter narrowing (31).

11. The hose nipple (5) as claimed in claim 9, wherein at least one latching lug (20), which, in a position of use, engages into a latching lug receiving element (21) on the nipple basic body (12), is located on an outside of the sleeve-shaped insert part (15), and an inclined face (28) which, when viewed from the receiving space, forms a diameter narrowing from a first diameter to a second diameter, is located on an inside of the sleeve-shaped insert part (15) in a region of the at least one latching lug (20), and the first diameter is greater than an outside diameter of the backflow preventer cartridge (26) and the second diameter is smaller than the outside diameter of the backflow preventer cartridge (26).

12. The hose nipple (5) as claimed in claim 11, wherein the backflow preventer cartridge (26) acts upon the inside inclined face (28) of the sleeve-shaped insert part (15) in a blocking direction (27) in such a manner that the at least one latching lug is fixed radially in the latching lug receiving element (21).

13. The hose nipple (5) as claimed in claim 9, wherein a contact face of the insert part (15) is defined on both sides in an axial direction by collars (8) or shoulders (34).

14. A hose arrangement, comprising a hose connecting piece (2), a hose nipple (5), and a connection element (9) which is held on the hose nipple (5) for releasably connecting to a water-bearing system, the hose nipple (5) comprising a nipple basic body (12), which has a flow-through channel (13) and at which a mouth (14) is realized, a contact flange (6) extends around the mouth (14) and is integrally formed on the nipple basic body (12) of the hose nipple (5), and a sealing ring (7) for sealing the contact flange (6), the sealing ring (7) is held by a collar (8) of the hose nipple (5) which engages behind the sealing ring (7), the collar (8) is formed on a sleeve-shaped insert part (15) that penetrates a ring aperture of the sealing ring (7) and the insert part (15) is connected to the nipple basic body (12) by a snap-type or latching-type connection (16), and a pressure hose (4) which is fastened on the hose nipple (5) in at least one of a force-fitting or form-fitting manner by a crimping sleeve (3).

15. The hose nipple (5) as claimed in claim 1, wherein the insert part has at least one latching lug (20) that extends continuously around at least one of the mouth (14) or the outlet aperture (18).

16. The hose nipple (5) as claimed in claim 1, wherein the sealing ring (7) is produced from a non-resilient material.

17. The hose nipple (5) as claimed in claim 1, wherein the sealing ring (7) is placeable onto the insert part (15) from one side without any deformation prior to producing the snap-type or latching-type connection (16).

18. The hose nipple (5) as claimed in claim 11, wherein in that realized radially on an outside of the backflow preventer cartridge (26) is a counter included face (30) which interacts with the inside inclined face (28) of the insert part (15) in such a manner that an axial application of the backflow preventer cartridge (26) is converted into a radially outwardly directed application of a latching lug (20) located on the outside of the insert part (15).

19. The hose nipple (5) of claim 9, wherein the backflow preventer cartridge (26) is inserted into the receiving space (25) in an orientation in which a blocking direction (27) which is defined by the backflow preventer cartridge (26) points from the backflow preventer cartridge (26) to the mouth (14).

\* \* \* \* \*